United States Patent
Wu et al.

(10) Patent No.: US 8,356,395 B2
(45) Date of Patent: Jan. 22, 2013

(54) ASSEMBLING DEVICE FOR ASSEMBLING ACTUATOR AND LENS MODULE

(75) Inventors: Cheng-Shiun Wu, Taipei Hsien (TW); Yu-Chien Huang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 864 days.

(21) Appl. No.: 12/488,547

(22) Filed: Jun. 20, 2009

(65) Prior Publication Data

US 2010/0037443 A1    Feb. 18, 2010

(30) Foreign Application Priority Data

Aug. 14, 2008  (CN) .......................... 2008 1 0303775

(51) Int. Cl.
   B23P 19/04  (2006.01)
   B25B 1/24   (2006.01)
   B25B 5/16   (2006.01)
   B25B 1/00   (2006.01)
   G02B 7/02   (2006.01)

(52) U.S. Cl. ............ 29/256; 29/259; 269/266; 269/156; 359/819

(58) Field of Classification Search .............. 29/256, 29/259; 359/819–823, 694–703; 269/266, 269/156, 282, 45, 75

See application file for complete search history.

(56) References Cited

U.S. PATENT DOCUMENTS

| | | | | | |
|---|---|---|---|---|---|
| 3,815,892 | A | * | 6/1974 | Tulk | 269/75 |
| 4,691,905 | A | * | 9/1987 | Tamura et al. | 269/45 |
| 5,145,157 | A | * | 9/1992 | Polk | 269/266 |
| 6,196,536 | B1 | * | 3/2001 | Hintze | 269/282 |
| 6,206,355 | B1 | * | 3/2001 | Lichtenberg | 269/156 |
| 6,953,188 | B2 | * | 10/2005 | Siegel | 269/266 |
| 7,373,277 | B1 | * | 5/2008 | Wu et al. | 702/185 |
| 7,375,404 | B2 | * | 5/2008 | Park et al. | 257/414 |
| 7,726,637 | B2 | * | 6/2010 | Stevenson et al. | 269/266 |
| 8,020,843 | B2 | * | 9/2011 | Wang | 269/266 |
| 8,126,141 | B2 | * | 2/2012 | Wu et al. | 380/54 |

* cited by examiner

*Primary Examiner* — Lee D Wilson
*Assistant Examiner* — Alvin Grant
(74) *Attorney, Agent, or Firm* — Altis Law Group, Inc.

(57) ABSTRACT

An assembling device for assembling an actuator and a lens module. The actuator includes a first top surface for supporting the lens module and a first bottom surface. The lens module includes a top portion for receiving lens and a bottom portion. The diameter of bottom portion is slightly larger than the top portion. The bottom portion further includes a second first bottom surface in contact with the first top surface. The assembling device includes a base, a support set, and a pressing sheet. The base includes a supporting surface for supporting the first bottom surface. The support set is above the base and defines at least three threaded holes therethrough. The pressing sheet is in contact with the second top surface. The at least three pins are movably threaded with the threaded holes correspondingly and configured for pushing the pressing sheet.

8 Claims, 4 Drawing Sheets

ASSEMBLING DEVICE FOR ASSEMBLING ACTUATOR AND LENS MODULE

BACKGROUND

1. Technical Field

The present disclosure relates to an assembling device for assembling an actuator and a lens module.

2. Description of Related Art

Microelectromechanical structure (MEMS) actuators are widely used in the camera modules for driving lens modules to focus. Currently, an assembling device is used to assemble a lens module onto a MEMS actuator. The assembling device includes a base and a pressing pole. When assembling, the MEMS actuator is firstly disposed on the base. Then, the lens module is disposed on the MEMS actuator. Next, the lens module is pressed onto the MEMS actuator using the pressing pole. Finally, glue is applied to a jointing portion of the lens module and the MEMS actuator, thereby assembling the lens module onto the MEMS actuator. The challenge of this assembling process is: pressing force of the pressing pole is applied to only a point of the lens module, thus evenness of the lens module is not guaranteed, which degrades quality of the lens module.

Therefore, what is desired is an assembling device for assembling an actuator and a lens module that can overcome the above described limitations.

DETAILED DESCRIPTION

Figure 1:
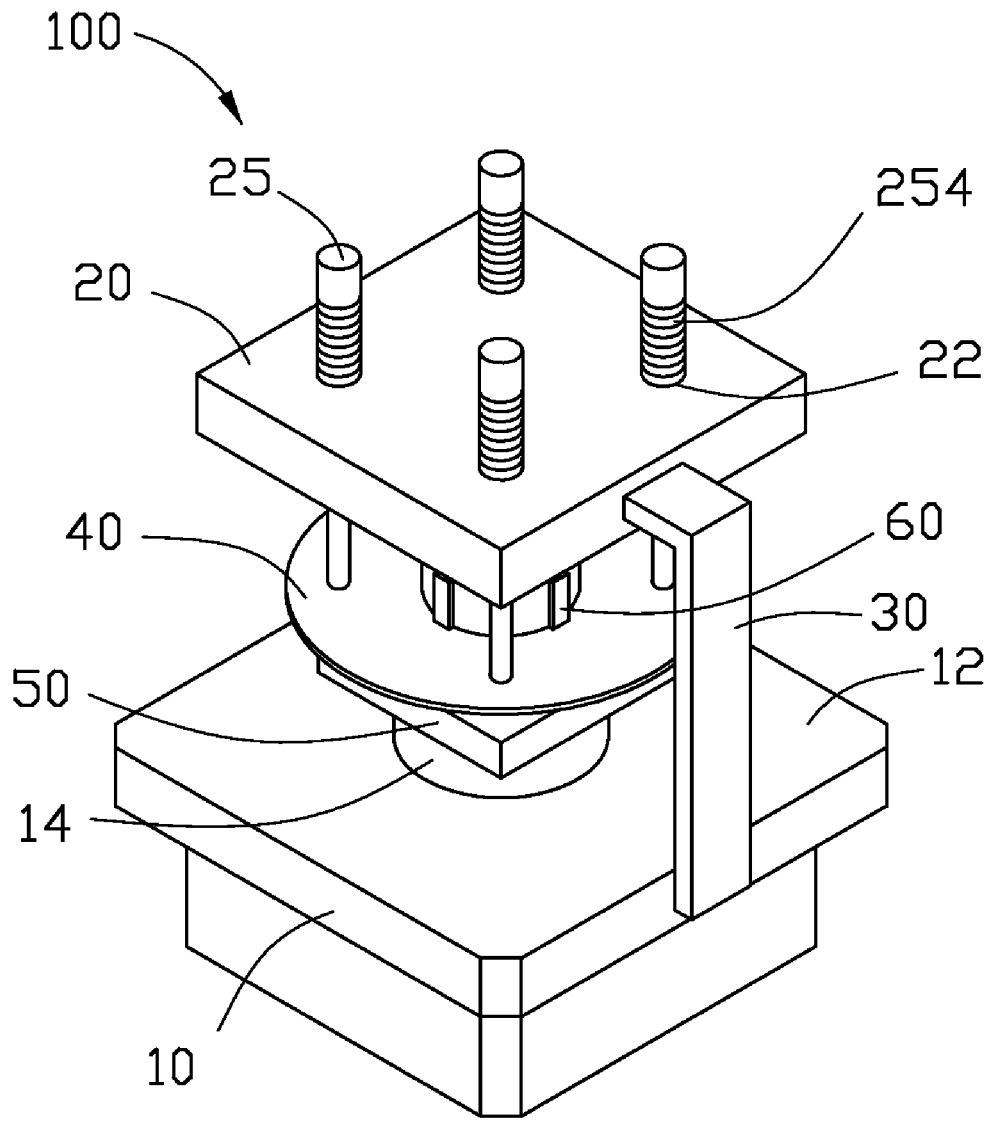
FIG. 1 is an assembled, isometric view of an assembling device for assembling an actuator and a lens module in according with one exemplary embodiment.
Figure 2:
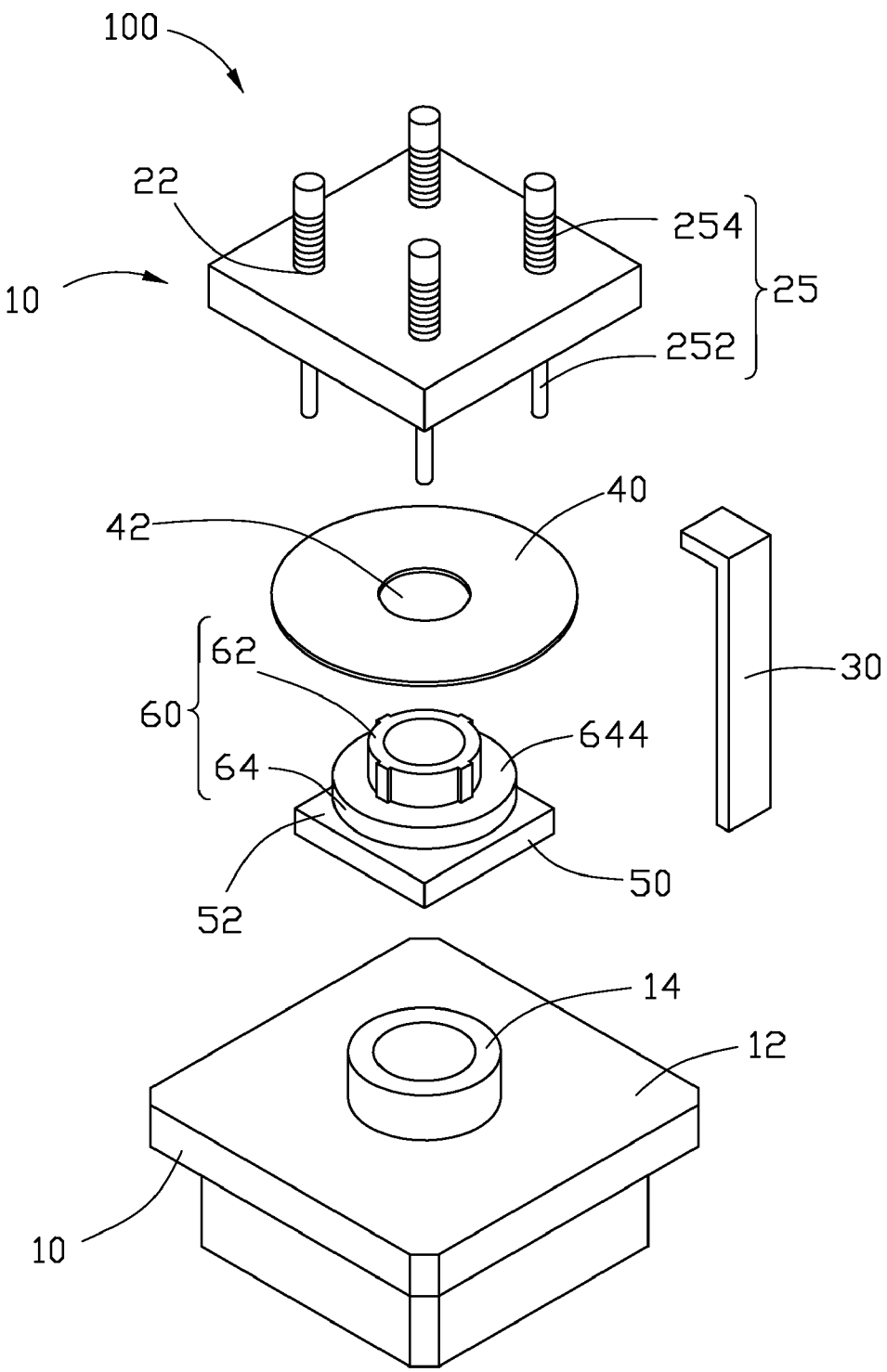
FIG. 2 is an exploded, isometric view of the assembling device of FIG. 1.

Referring to FIGS. 1-2, an assembling device 100 for assembling a actuator 50 and lens module 60 in accordance with an exemplary embodiment is illustrated. The assembling device 100 includes a base 10, a support 20 arranged above the base 10, four pins 25 movably threaded with the base 20, a connecting member 30 for connecting the base 10 and the support 20, and a pressing plate 40 pasted on the lens module 60 for transmitting, when the pressing plate 40 pressed by the pins 25, pressing forces of the four fins 25 transmits to the lens module 60.

The base 10 includes a supporting surface 12 for supporting the actuator 50 and a column 14. The column 14 is extended perpendicularly upward from the supporting surface 12.

The support 20 is a rectangular plate in shape, and is aligned with the column 14 of the base 10. Four threaded holes 22 are defined through the support 20. Orthogonal projection of the four threaded holes 22 onto the supporting surface 12 surrounds the column 14.

The lengths of the four pins 25 are equal to each other, and each includes a pressing portion 252 and a threaded portion 254 mating with the threaded hole 22. The pins 25 are inserted through the respective threaded holes 22, and the threaded portions 254 are threadedly engaged with the threaded holes 22. Each of the pins 25 also defines a depth scale at an end adjacent to the threaded portion 254 thereof. The depth scale is configured for indicating a position of the distal end adjacent to the pressing portion 252, thereby allowing determination of positioning the four pins 25 so that a plane is defined by the distal ends of the pins 25.

It should be mentioned that the number of the pins 25 and the threaded holes 22 are not limited by this description. Generally, more than three points can determine a plane. Therefore, in other alternative embodiments, the assembling device 100 can include three or more than four pins 25, and the support 20 can correspondingly define three or more than four holes 22 corresponding to the pins 25.

The height of the connecting member 30 is a strip shaped and is slightly greater than the total height of the column 14, the actuator 50, and the lens module 60. One end of the connecting member 30 is connected to the base 10, and the other end is connected to and for supporting the support set 20.

The pressing plate 40 is a ring in shape. A circular through hole 42 is defined at the center of the pressing plate 40.

Figure 3:
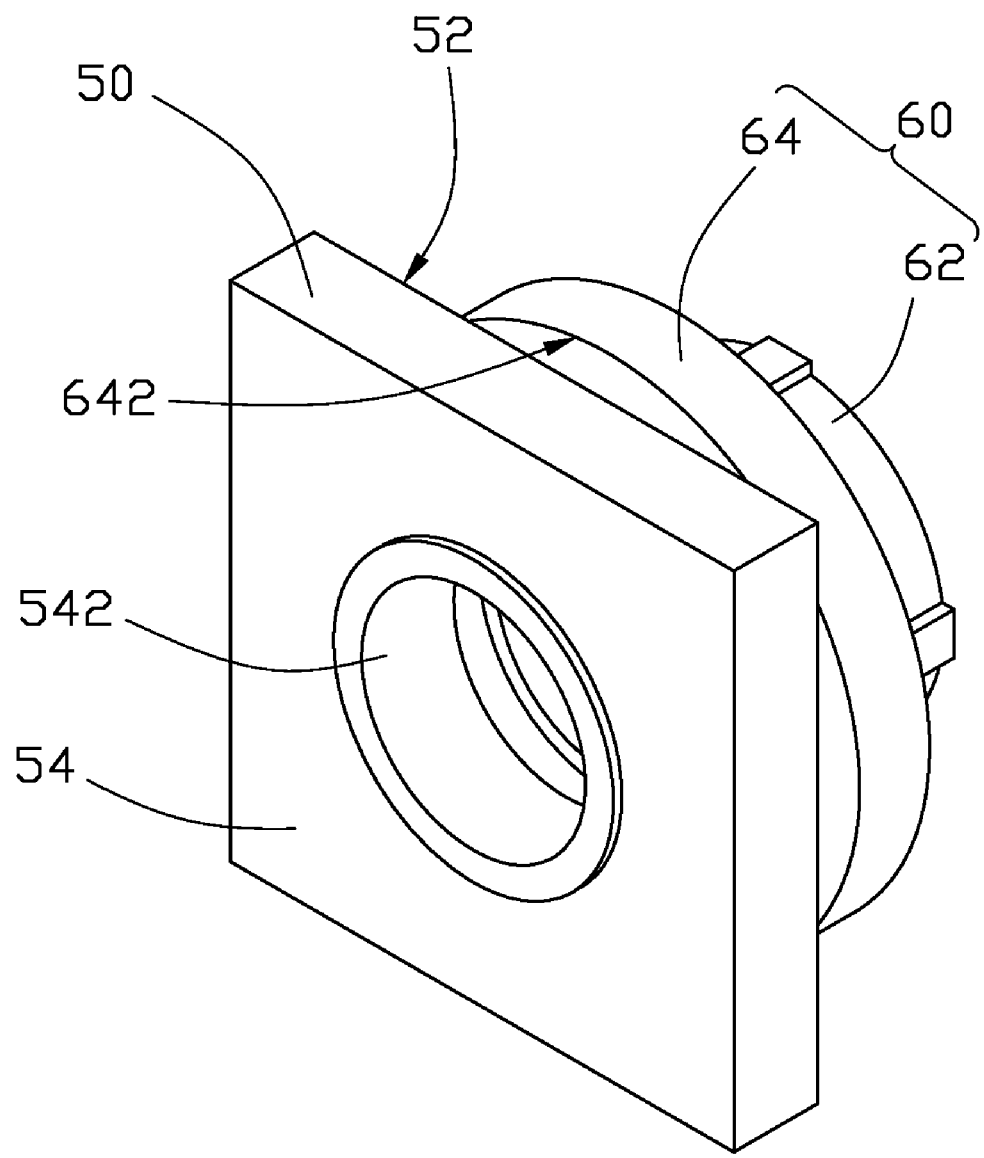
FIG. 3 is an assembled, isometric view of the actuator and the lens module of FIG. 1.
Figure 4:
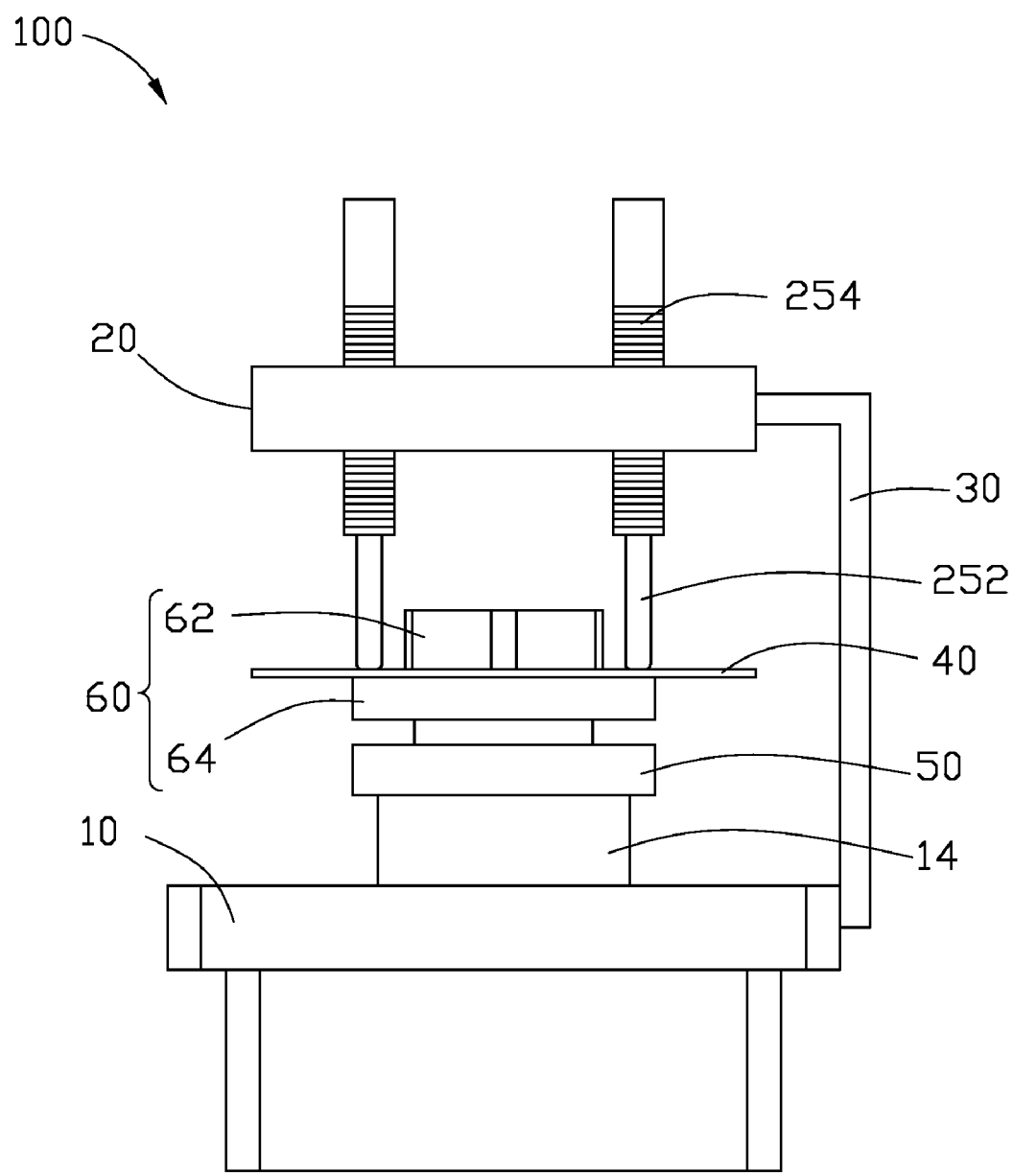
FIG. 4 is an assembled, side view of the assembling device of FIG. 1, together with the actuator and the lens module.

Also referring to FIGS. 3-4, in this embodiment, the actuator 50 is a Microelectromechanical structure (MEMS) actuator. The actuator 50 is a plate in shape and includes a first top surface 52 for supporting the lens module 60, and a first bottom surface 54 facing away from and being parallel to the first top surface 52. The actuator 50 defines a circular hole 542 through the first top surface 52 and the first bottom surface 54 to allow light incident from the lens module 60 passing therethrough to the image sensor (not shown). The diameter of the column 14 is substantially equal to the diameter of the circular hole 542. The height of the column 14 is slightly smaller than the thickness of the actuator 50. Thereby, the column 14 can position the actuator 50 on the supporting surface.

The lens module 60 includes a tube-shaped top portion 62 for receiving lens (not shown), and a tube-shaped bottom portion 64. The insides of the top potion 62 and the bottom portion 64 communicate with each other. The outer diameter of bottom portion 64 is larger than the top portion 62, thereby forming a second top surface 644 therebetween. The inner diameter of the through hole 42 is slightly larger than the outer diameter of the top portion 62 and small than the outer diameter of the bottom portion 64. Therefore, the pressing plate 40 can be placed on the second top surface 644 and pasted thereon. The bottom portion 64 also includes a second bottom surface 642 facing away from and being parallel to the second top surface 642. After assembled, the second bottom surface 642 is evenly pasted to the first upper surface 52.

When assembling the lens module 60 onto the MEMS actuator 50. Firstly, the MEMS actuator 50 is disposed on the base 10 and positioned by the column 14. Then, the lens module 60 is disposed on the MEMS actuator 50 with the second bottom surface 642 in contact with the first top surface 52. Next, the pressing plate 40 is sleeved into the top portion 62 and supported by the second top surface 644. The pins 25 are adjusted to the same position with assist of the depth scale to define a plane parallel to the first top surface 52. Also, in this state, the pressing plate 40 is pressed by the pins 25 and thereby pasted to the second top surface 644. Finally, a glue (not shown) is coated around the peripheral of the bottom portion 64 of the lens module 60 to firmly fix the lens module 60 onto the MEMS actuator 50.

Because each of the screw thread portion 254 of the pins 25 have depth scales thereon, the four pins 25 are capable of rotating at same height via the scales to press the pressing plate 40, the pressing force of the pressing plate 40 is applied to the second top surface 644 of the lens module 60, so as to tightly press the lens module 60 against the MEMS actuator 50. Smoothness between the lens module 60 and the MEMS actuator 50 is higher.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. An assembling device for assembling a lens module onto an actuator, the assembling device comprising:
   a base configured for touching and supporting the actuator;
   a support positioned above the base and defining at least three threaded holes therethrough;
   a pressing plate configured for being sleeved over and in contact with the lens module;
   a connecting member, one end of the connecting member connected to the base, and the other end of the connecting member connected to the support, the connecting member supporting the support above the base; and
   at least three pins, each of the at least three pins screwing into a respective one of the at least three threaded holes and configured for pushing the pressing sheet to press the lens module on the actuator.

2. The assembling device as claimed in claim 1, wherein the base comprises a supporting surface and a column extending perpendicularly upward from the supporting surface, and the column is configured to position the actuator on the supporting surface.

3. The assembling device as claimed in claim 2, wherein the support is aligned with the column of the base, the at least three threaded holes are defined through the support, orthogonal projections of the at least three threaded holes on the supporting surface surround the column.

4. The assembling device as claimed in claim 1, wherein height of the connecting member is greater than a total height of the column, the actuator, and the lens module.

5. The assembling device as claimed in claim 1, wherein the pressing plate is ring-shaped, and has a circular through hole defined in its center.

6. The assembling device as claimed in claim 1, wherein the at least three pins have a same length.

7. The assembling device as claimed in claim 1, wherein each of the at least three pins comprises a pressing portion and a threaded portion engaging with the respective threaded hole.

8. The assembling device as claimed in claim 7, wherein each of the at least three pins also defines a depth scale at its end adjacent to the threaded portion thereof.

* * * * *